United States Patent
Maier et al.

(10) Patent No.: US 6,814,997 B2
(45) Date of Patent: Nov. 9, 2004

(54) SOLUBLE POWDER FOR ESPRESSO TYPE BEVERAGE

(75) Inventors: Hanspeter Maier, Mörfelden-Walldorf (DE); Ludwig Bachtler, Bluettelborn (DE)

(73) Assignee: Nestec S.A., Vevey (CH)

( * ) Notice: Subject to any disclaimer, the term of this patent is extended or adjusted under 35 U.S.C. 154(b) by 110 days.

(21) Appl. No.: 10/386,570

(22) Filed: Mar. 13, 2003

(65) Prior Publication Data

US 2003/0157235 A1 Aug. 21, 2003

Related U.S. Application Data

(63) Continuation of application No. PCT/EP01/12044, filed on Oct. 17, 2001.

(30) Foreign Application Priority Data

Oct. 20, 2000 (EP) .............................................. 00122858

(51) Int. Cl.$^7$ ................................................... A23F 5/00
(52) U.S. Cl. ........................ 426/594; 426/564; 426/477
(58) Field of Search .................................. 426/477, 594, 426/564, 422

(56) References Cited

U.S. PATENT DOCUMENTS

| | | | |
|---|---|---|---|
| 4,746,527 A | 5/1988 | Kuypers | 426/569 |
| 5,620,733 A | 4/1997 | Chaveron et al. | 426/580 |
| 5,882,716 A | 3/1999 | Munz-Schaerer et al. | 426/591 |
| 5,882,717 A * | 3/1999 | Panesar et al. | 426/595 |
| 6,098,524 A * | 8/2000 | Reese | 99/280 |
| 6,168,819 B1 * | 1/2001 | Zeller et al. | 426/569 |

FOREIGN PATENT DOCUMENTS

| | | |
|---|---|---|
| EP | 0 885 566 A1 | 12/1998 |
| EP | 0 891 715 A1 | 1/1999 |
| EP | 1 135 992 A1 | 9/2001 |

* cited by examiner

*Primary Examiner*—Anthony Weier
(74) *Attorney, Agent, or Firm*—Winston & Strawn LLP

(57) ABSTRACT

The present invention relates to a soluble coffee beverage which closely assimilates the texture characteristics of an Italian espresso, namely a beverage with a fine crema, but which has a reduced bitterness compared with freshly brewed espresso but which nevertheless is strong in aroma. The soluble coffee beverage powder includes a soluble gas containing matrix that has between 10% and 35% soluble coffee solids by weight of the total dry matter of the matrix, from about 10% to about 35% pre-flocculated creamer by weight, and from about 12% to about 30% oligosaccharrides effective to dilute protein in the creamer by weight. The soluble beverage powder upon reconstitution with hot water provides a foamed upper surface based upon all of the ingredients, and in which the foamed upper layer substantially all of the foam is made up of bubbles having a diameter in the range of 0.05 to 0.5 mm. In another aspect, the invention relates to a process for making such a product.

8 Claims, No Drawings

SOLUBLE POWDER FOR ESPRESSO TYPE BEVERAGE

CROSS-REFERENCE TO RELATED APPLICATIONS

This application is a continuation of the US national phase designation of International application PCT/EP01/12044 filed Oct. 17, 2001, the entire content of which is expressly incorporated herein by reference thereto.

FIELD OF THE INVENTION

This invention relates to a soluble coffee beverage powder, which, upon the addition of water, forms a coffee beverage having a foamed upper surface. In particular the invention relates to a soluble coffee beverage which when reconstituted has a "crema".

BACKGROUND TO THE INVENTION

Soluble coffee beverage products are well known products, which upon the addition of water (usually hot) provide a coffee beverage. It is also well known to mix the soluble coffee powder with soluble creamer or whitener powders to produce whitened coffee beverages. These classical soluble beverage products are coffee beverages without any foam on the upper surface.

Soluble coffee beverage products of the instant "cappuccino" type are also known and are commercially available. Usually these products are dry mixes of a soluble coffee powder and a soluble whitener powder. The soluble whitener powder contains pockets of gas, which, upon dissolution of the powder, produce foam. Therefore, upon the addition of water (usually hot), a whitened coffee beverage, which has a milk based foam on its upper surface, is formed; the beverage resembling, to a greater or less extent, traditional Italian cappuccino.

In coffee bars and restaurants, it is usual to serve freshly brewed black coffee that is prepared on the basis of roast and ground. The freshly brewed black coffee is characterized by a light brown foamy layer that covers the upper surface of the beverage. The coffee is usually prepared in an espresso-type machine in which one may, e.g., brew a short strong espresso or a larger cup of black coffee.

The light brown foamy layer on the espresso is not milk based, as is the case for cappuccino beverages, but it originates from the carbon dioxide and air captured in the coffee ground and that are released when the coffee is brewed. The foamy layer on an espresso is often referred to as a "crema". The crema on a freshly brewed espresso is characterized as a light brown foamy layer, which covers substantially all the surface of the beverage, and remains on it during consumption.

The espresso-type beverage is generally found attractive to consumers. However, espresso-type beverages have a particular bitter taste, which to some consumers is considered to be too strong. A common problem when aiming to reduce bitterness of coffee beverage is that the coffee aroma will be diluted as well. Further, if, e.g., sugar is used to mask bitterness in a coffee beverage, once sufficient sugar has been added to the beverage, sugar becomes dominant in the cup profile. Milk, especially whole milk, may be used for balance of aggressive note of the coffee beverage and mask the potential process notes. However, milk as such is found not to be sufficient for masking the bitterness of the coffee beverage.

Accordingly, there is a need for a new soluble coffee beverage, which is an alternative to the above-discussed soluble beverage powder, and to one that is reminiscent of a freshly brewed espresso-type beverage.

SUMMARY OF THE INVENTION

The present invention now provides a soluble coffee beverage which closely assimilates the texture characteristics of an Italian espresso, namely a beverage with a fine crema, but which has a reduced bitterness compared with freshly brewed espresso despite retaining a strong aroma. The crema substantially covers the entire surface of the beverage in a thin layer and is sufficient stable to remain on the surface of the beverage until the last sip of the beverage.

The present invention also provides a soluble coffee beverage that comprises a soluble coffee creamer that can be reconstituted without flocculation problems. Moreover, this soluble coffee beverage powder has a substantially homogeneous color.

In particular, the present invention provides a soluble coffee beverage that includes a soluble gas containing matrix comprising from between 10% and 35% soluble coffee solids by weight of the total dry matter of the matrix, from about 10% to about 35% pre-flocculated creamer by weight, and from about 12% to about 30% oligosaccharrides effective to dilute protein in the creamer by weight. Upon the addition of water, this powder forms a coffee beverage having a foamed upper surface. In this foamed upper layer, substantially all of the foam is made up of bubbles having diameters in the range of 0.05 to 0.5 mm.

Another embodiment of the invention relates to a process for providing a soluble coffee beverage powder, which, upon the addition of water, is forming a coffee beverage having a foamed upper surface. This process comprises providing between 10% and 35% soluble coffee solids by weight of the total dry matter of the matrix, from about 10% to about 35% pre-flocculated creamer by weight, and from about 12% to about 30% oligosaccharrides effective to dilute protein in the creamer by weight, mixing the ingredients to a wet mix with a liquid, incorporating gas into the mixture, and drying the wet mix to a soluble beverage powder comprising a gas-containing matrix, which soluble beverage powder upon reconstituting provides a foamed upper surface based upon all of the ingredients. As noted above, in this foamed upper layer, substantially all of the foam is made up of bubbles having a diameter in the range of 0.05 to 0.5 mm.

DETAILED DESCRIPTION OF THE PREFERRED EMBODIMENTS OF THE INVENTION

It has surprisingly been found that the soluble coffee beverage of the invention may be obtained by providing a wet mix containing between 10 and 35% of coffee solids and 10 to 35% coffee creamer, and 12 to 30% oligosaccharrides. The viscosity of the wet mix is lowered compared to that of milk or cream wet mix without coffee. This enables that, when the wet mix is subsequently subjected to gassing in an amount effective to foam the product, a fine gas bubble is capable of being generated. The size of these bubbles is substantially smaller than bubbles that are, e.g., generated in conventional foaming coffee creamers based on milk or cream solids. If the gassed wet mix subsequently is subjected to a homogenization step, a further reduction of the bubble gas size in the wet mix may be obtained. These small size gas bubbles are retained in the product once it has been dried. When the soluble beverage powder is reconstituted it has a foam upper surface of fine bubbles with the characteristics of an espresso crema.

It has further been found that aqueous based aroma is particular desirable for use in the present invention. When aqueous based aroma is used in a wet mix, it uses milk fat or other fat in the coffee creamer as a carrier. Further, it has been found that the aqueous aroma masks the cooked taste of the coffee and contributes with a fresh brewed taste to the beverage. In this context it should be appreciated that aqueous based aroma is normally the part of the aroma that is considered a waste product. This makes it even more surprising that the aqueous based aroma has the advantages described herein.

It has also been found that the cup profile of such a formulation lacks of bitterness and other notes typically of fresh brewed coffee. This may occasionally occur with some soluble beverage powders, but often special soluble beverage notes are present such as notes associated with "dry", "caramel" and "bready" notes. These notes may be reduced by adding milk or coffee whitener to the soluble beverage, but they cannot be eliminated totally in this way. It has surprisingly been found that by using aqueous aroma according to the present invention, these kinds of notes may be eliminated totally.

Surprisingly, the aqueous aroma also masks the cooked notes of the milk powder or creamer component usually in soluble milk coffee beverages. Furthermore, the aqueous aroma boosts the coffee aroma intensity without introducing any aggressive notes or off flavors.

In a preferred embodiment of the invention, the ingredients are wet mixed together prior to drying. This gives an attractive substantially homogeneous color to the coffee beverage powder.

Advantageously coffee aroma is incorporated in the wet mix as well. Preferably aqueous based aroma as discussed above is used. This has the advantage that the coffee aroma is also present in the foam on the surface of the beverage, as opposed to, e.g., the milk-based foam on a cappuccino that usually lacks aroma. The beverage provided by the invention may therefore have a foamer with a strong smell of coffee, which corresponds to the crema on an Italian espresso.

It is of course possible to merely mix together a soluble coffee powder and an appropriate creamer powder to provide a soluble beverage powder having the coffee and creamer in the correct proportions. However, the soluble beverage powder obtained does not provide an acceptable solution. In particular, the soluble coffee powder and the creamer powder are prone to separate to some extent during storage. Therefore it is difficult to ensure that the soluble beverage powder is completely homogeneous. Also the soluble beverage powder does not have a homogeneous color. Further, upon reconstitution, the milk proteins in the creamer tend to flocculate and this severely affects consumer perception of the product.

Further, it is not possible to produce an acceptable product by simply mixing together a liquid creamer and a coffee extract and then drying the mixture to powder. Although the powder obtained will be homogeneous, when reconstituted, flocculated milk proteins are very visible in the beverage obtained. The flocculated milk proteins severely affect consumer acceptability. The problem of flocculation of the milk proteins in coffee beverages has been satisfactorily dealt with in U.S. Pat. No. 5,620,733. This patent describes a process in which the milk proteins are subjected to a controlled flocculation step during processing. Subsequently to the controlled flocculation step, the liquid creamer and a small amount of coffee extract are subjected to homogenization and drying to provide a creamer powder. Further soluble coffee powder is then dry mixed in with the creamer powder. After processing in this way, any flocculated milk proteins in the reconstituted beverage are too small to be visible. In the context of the present invention it is desirable to subject the wet mix to a pre-flocculation treatment corresponding to that of U.S. Pat. No. 5,620,733.

It has further surprisingly been found that in a wet mix of these kind coffee solids in as high as between 25% and 35% coffee solids by weight may be mixed with a creamer if the creamer has been subjected to a pre-flocculation treatment. This may be possible without any flocculation of the milk protein in the coffee creamer. For some purposes it is advantages to add stabilizers to the wet mix gives the beverage a lighter color. It is preferred that from 0.25% to 1.5% of stabilizers by weight be added to the other ingredients.

In the present context unless otherwise indicated the weight % given are based on the weight of the solids in the final product.

For the preparation of the beverage powder, coffee solids are conveniently provided in the coffee liquor. The coffee liquor may be obtained using any suitable procedure. Usually, the coffee liquor is prepared by concentrating a coffee extract obtained from a coffee extraction process to the desired coffee concentration. The coffee extract may be produced in the usual manner by subjecting roasted coffee beans to extraction. Any suitable extraction procedure may be used because the choice and design of the extraction procedure is a matter of preference and has no critical impact on the invention. Suitable extraction procedures are described in U.S. Pat. Nos. 5,897,903 and 5,997,929, the entire disclosures of each of which are expressly incorporated herein by reference thereto. Similarly, any suitable concentration procedure may be used because the choice and design of the concentration procedure is a matter of preference by the skilled artisan and has no critical impact on the invention. Of course, the coffee liquor may also be prepared by dissolving soluble coffee powder in water to the desired concentration.

Coffee replacers or surrogates such as chicory may also be used, but this will provide a cup profile that is less aromatic and has no coffee aroma at all.

Soluble creamer powders are well known and are widely used, particularly as coffee or tea creamers. Conventionally creamer powders contain protein, fats and sweeteners but other ingredients such as emulsifiers, stabilizers and buffers may also be included. Further, the creamers come in various forms such as milk-based creamer powders and non-dairy creamer powders, and gassed creamer powders. These creamer powders are typically produced by subjecting a solution containing their components to spray drying.

For the present invention preferred coffee creamers are whole milk or skimmed milk, natural or reconstituted from powder; milk derivatives a cream or coffee whitening agent comprising for instance lactic proteins, lactose and where appropriate vegetable fat.

It has been found that oligosaccharrides which have the effect of diluting the protein of coffee creamers are particular useful in the beverage powder according to the invention. This effect of certain oligosaccharides is a means for reducing sediment and flocculation problems in the beverage. A preferred amount of oligosaccharrides of this type is in the range of 12 to 30% by weight of solid matter of the beverage powder.

A preferred oligosaccharride is oligofructose. It has been found to have particular protein diluting effects. In addition, although the oligofructose has no particular foam stabilizing effect, it is perfectly soluble and may be added e.g. up from 1 to 25% (related to dry matter) without changing the cup profile.

Advantageously, the oligofructose has a degree of polymerization between 2 and 8. A suitable oligofructose may be obtained from Raftilose (Orafti). To minimize the impact on the cup profile, it is desirable that the oligofructose has a concentration of mono- and disaccharides in the range from about 3% to about 7%.

A positive side effect of the high amount of oligofructose is that the beverage of the invention may have a prebiotic effect. A prebiotic effect may possible be achieved at a daily dose of 6 g oligofructose. This corresponds to a consumption of 2 to 4 cups of beverage a day.

An alternative oligosaccharride, which may preferably be used, is lactose, which dilutes the protein of the milk in the same way.

Stabilizers may be used in order in an amount sufficient to reduce flocculation or in order to eliminate obvious feathering during the preparation of the coffee beverage. If the dispersion of the pre-flocculated protein and the fat particles is fine enough, the beverage is uniformly yellow brown. In the case of flocculation, the beverage becomes darker because the particles float to the downside of the foam or to the bottom of the cup. The stabilizers reduce sedimentation. It is preferred that from 0.25% to 1.5% of stabilizers by weight is added to the ingredients. Preferably, a combination of phosphates and citrates is used. It has been found that this combination may be used without generation of soapy notes, which often is present when stabilizers are used.

The soluble coffee beverage powder may also include a soluble sweetener, natural or artificial. Suitable examples include sucrose, fructose, lactose, maltose, saccharin, cyclamates, acetosulfame, L-aspartyl based sweeteners such as aspartame, and the like, and mixtures of these. The amount of the sweetener used will vary depending upon the desired level of sweetness and the strength of the sweetener. However for sugar based sweeteners, the total amount of sweeteners is usually in the range of about 10% to about 25% by weight. The soluble sweetener may also be combined with bulking agents such as maltodextrins and polydextrose, particularly if an artificial sweetener is used. In this case, the total amount of sweetener and bulking agent is usually in the range of about 10% to about 25% by weight; artificial sweetener itself usually comprising less than 1% by weight. For a sweeter variety of the soluble beverage powder according to the invention, a more sweet type of oligofructose may also be selected. An oligofructose with up to 45% mono- and disaccharides is particular suitable for this purpose.

In a preferred version of the soluble coffee beverage of the invention, from 15 to 25% of sugar are included.

The present invention provides a soluble coffee beverage, which closely assimilates the texture characteristics of an Italian espresso, namely a beverage with a fine crema. The reconstituted beverage provides a foamed upper surface of all of the ingredients, and in which substantially all of the foam is made up of bubble having a diameter in the range of 0.05 to 0.5 mm. A bubble size in this range can barely be seen with the bare eye. The invention provides foam with a bubble size so small that substantially no single bubbles can be detected in the main part of the crema. This applies also to a cream of an Italian style Espresso.

It has been found that with a powder particles size from 100 to 200 μm, and the gas bubbles in the powder are in the walls of bubbles, the bubble size after preparation is between 0.01 and 0.5 mm and the pressure in the bubbles is below 5 bar. A more preferred foam bubble diameter is in the range of 0.1 to 0.4 mm, and even more preferred in the range of 0.2 to 0.3 mm. It has been found that with small foam bubble diameters such as from 0.05 to 0.5 mm, a crema is obtained that substantially covers the entire surface of beverage in a thin layer and that it is sufficiently stable to remain on the surface of the beverage until the last sip of the beverage is consumed.

The size of the foam bubbles may be measured and directly evaluated by means of a scanner, e.g., by scanning the product foam and measuring the bubble size. A suitable scanner is e.g. HP Scanjet II CX or Agfa Snapscan.

Merely processing the roasted coffee beans to a coffee base concentrate as described above will result in the loss of substantially all coffee aroma. Therefore, it is preferred to specifically strip off and then collect the coffee aroma during processing. In this way, the coffee aroma is not lost and is returned to the powder. Processes for stripping off and collecting the coffee aroma are well known. Usually coffee aroma is stripped off at one or more stages; for example:— using an inert gas or steam during, or immediately after, grinding of the coffee beans, and using steam to strip coffee aroma from the coffee extract during extraction.

Alternatively, the fresh coffee grounds may be slurried in water or coffee extract and the coffee aroma stripped from the slurry. A suitable procedure is described in U.S. Pat. No. 6,149,957, the entire disclosure of which is expressly incorporated herein by reference thereto.

The coffee aroma may be captured using any suitable procedure. Ordinarily, the coffee aroma is captured by condensing from the carrier gas it in one or more condensers. Preferably more than one condenser is used; each succeeding condenser being operated at a lower temperature than the previous condenser. If necessary or desired, one of the condensers may be a cryogenic aroma condenser. A suitable cryogenic aroma condenser is described in U.S. Pat. No. 5,182,926; the disclosure of which is incorporated by reference. The captured coffee aroma may, if desired, be concentrated using a suitable technique such as partial condensation or rectification. The captured coffee aroma may be combined with a suitable carrier substrate such as coffee oil or emulsion containing coffee oil or other fats. Aqueous coffee aroma components and organic coffee aroma components are then separated. A suitable method for separating aqueous coffee aroma components from organic coffee aroma components is described in US published patent application 2002018839, the disclosure of which is expressly incorporated herein by reference thereto.

The processes for the production of the coffee extract and capture of the coffee aroma may be carried out under oxygen reduced or oxygen free conditions if desired. This may be accomplished as is known in the art; for example by carrying out the processes under a blanket of inert gas. Further, deoxygenated water may be used whenever water is necessary in the process.

The coffee aroma is preferably stored under oxygen reduced or oxygen free conditions and frozen. Similarly, the coffee base concentrate may be stored under oxygen reduced or oxygen free conditions. Further, if desired, oxygen scavengers may be added to the coffee aroma and/or coffee base concentrate. Suitable oxygen scavengers are described in U.S. Pat. No. 6,093,436, the disclosure of which is expressly incorporated herein by reference thereto.

The soluble beverage powder preferably contains about 0.05% to about 0.5% by weight of aqueous coffee aroma components; more preferably about 0.1% to about 0.3% by weight.

Preferably the aqueous coffee aroma components include highly volatile aqueous aroma components that condense at temperatures less than about 0° C.

The aqueous coffee aroma components are natural aroma components that may be collected during the preparation of soluble coffee powder. This may be done by standard procedures for collecting coffee aroma components or by suitably modifying the standard procedures. Preferably, the natural aroma components include highly volatile aroma components. Highly volatile aroma components are those which condense at a temperature below about 0° C.

To collect highly volatile aroma components, the standard procedures usually entail flushing volatile aroma components from the coffee during processing using an inert carrier gas such as nitrogen. The aroma-laden carrier gas is then chilled to temperatures lower than about −40° C., and sometimes as low as about −195° C., to cause the aroma components to condense. The condensed aroma components are then collected. The condensed aroma components are then usually absorbed into an aroma substrate; usually an oil. Alternatively, the aromas may be absorbed into the aroma substrate during condensation. Suitable standard procedures are disclosed in, for example, U.S. Pat. Nos. 3,823,241, 5,030,473, and 5,222,364, the disclosures of each of which are expressly incorporated herein by reference thereto.

However, in the standard procedures described above, the aromatized aroma substrate obtained contains both aqueous and organic aroma components. In general, the aqueous components are then removed and often discarded because they are unstable and cause instability problems. This leaves the aroma substrate containing substantially only organic aroma components. However, instead of discarding these aqueous components, these components are collected in the form of an aqueous aroma solution.

The aqueous aroma solution is then added to the other components making up the beverage prior to drying of the components. Sufficient aqueous aroma solution may be added such that the aqueous coffee aroma components comprise about 0.05% to about 0.5% by weight of the beverage powder; and preferably about 0.1% to about 1% in the concentrate before drying.

The coffee creamer is conveniently produced by preparing a creamer solution containing the desired amount of protein, carbohydrate and lipids. For example, 30% skimmed milk, 40% lactose, 30% vegetable oil or milk fat. Water may be added when powdered raw material is used.

The creamer solution is then heat treated at about 90° C. to about 120° C. for about 1 to about 500 seconds; and preferably about 105° C. to about 115° C. for about 5 seconds to about 20 seconds. This may be carried out in a heat exchanger or by direct injection of steam, or a combination of both. The creamer solution is then concentrated by evaporation, and usually to a total solids concentration of about 40% to about 60% by weight. Suitable evaporators may be used.

A coffee solution may then be added to the concentrated creamer solution. The coffee solution may as discussed above be a concentrated coffee extract obtained from a coffee extraction process or may be prepared by dissolving coffee powder into a desired amount of water. The concentration of the coffee solids in the coffee solution is preferably similar to the concentration of the creamer solids in the concentrated creamer solution.

Further, the aqueous aroma as described above is added to the concentrated creamer solution, as well as the soluble filler, and stabilizers may preferably be added to the concentrated creamer solution.

The wet mix is then subjected to a pre-flocculation treatment. The pH of the concentrated mixture is, if necessary, standardized to about 5.5 to about 6.5 and preferably from about 6.1 to about 6.4. Also, if necessary, the calcium content of the mixture may be standardized to about 3 to about 5 mmol/l. The aroma substrate may then be mixed into the standardized mixture.

The mixture is then subjected to heat treatment at about 90° C. to about 120° C. for about 1 to about 500 seconds; and preferably at about 105° C. to about 115° C. for about 5 seconds to about 20 seconds. This may be carried out in a heat exchanger or by direct injection of steam, or a combination of both. This heat treatment causes controlled flocculation of proteins in the mixture.

It is also possible to carry out the pre-flocculation treatment on the concentrated creamer solution prior to addition of the coffee solution, but this is less preferred.

The wet mix is then subjected to homogenization. This is preferably carried out in two stages. For example homogenization may be carried out in a first stage at about 10 MPa to about 30 MPa and then in a second stage at about 2 MPa to about 7 MPa.

Subsequently, the wet mix may be gassed by injecting of a gas such as nitrogen or carbon dioxide into it. The gas is then dispersed within the mixture by means of a dispersing machine and the gassed mixture is then passed onto a homogenizer.

Preferred amount of gases are from about 10 to about 30 liters of gas for each 10 kg of dry matter. More preferably from about 15 to about 25 liters of gas for each 10 kg of dry matter. The preferred gas is nitrogen as it has been found to give the best foaming effect of the powder.

The gassed and homogenized mixture is then spay-dried in a conventional manner. The spray-dried powder has a matrix comprising the soluble filler and the soluble coffee solids. The spray drying may conveniently take place in a spray-drying tower having for example a De-Lavan spray nozzle. The pressure in front of the nozzle is preferably in the range of from 45 to 70 bars and the temperature in the tower is preferably in the range of from 75 to 9520 C. Subsequent to the drying, the powder may be cooled in a fluidized bed cooler and exits the final sieve at a temperature of 40° C. It is preferred that the tapped specific gravity of the powder be in the range from about 150 to about 250 g/l, and more preferably is between about 200 and about 220 g/l. Tapped specific gravity is referring to the gravity of the powder when compressed by vibrating the powder with 100 pushes of 10 mm.

EXAMPLES

Specific examples are now described to further illustrate the invention.

Example 1

Preparation of the Soluble Coffee Beverage Powder

Samples of the soluble coffee beverage powder according to the invention are prepared as follows: All figures are given as dry matter in the final product.

1) A coffee creamer is prepared by diluting 20% wt sugar, and 10 to 30% wt oligofructose in whole milk.

2) Adding stabilizers of 0.5 to 1.0% wt of sodium hydrogen phosphate and 0.1 to 0.5% wt sodium citrate to the coffee creamer in a watery solution.

3) Additional water is added to provide a total dry matter content of 16%+/−2% prior to evaporation and the first heat treatment.

4) Adding aqueous coffee aroma to the coffee creamer concentrate at 0.3 to 1% wt.

5) Providing a coffee liquor of 45 to 50% dry matter content, and mixing the coffee liquor with the creamer part in a ratio of 25 to 30%.

6) The mixture is subjected to a second heat treatment for pre-flocculation at 100 to 110° C.

7) The mixture is gassed with a 2 to 3 liters of nitrogen per kg of dry matter.

8) The samples are now optionally subjected to a homogenization step at 100 to 110 bars, in a first stage, and a second stage of 50 to 60 bars, in a conventional homogenizer.

9) The mixture is fed to the spray dryer and spray-dried at 80 to 90° C. in a spray drying tower with an output of about 700 kg per hour.

10) The sprayed coffee powder is cooled to about 40° C.

The tapped specific gravity of the final soluble coffee powder after cooling is between 200 and 250 g/L.

Example 2

Preparation of the Beverage

Samples of beverage are prepared as follows:

7 g of a soluble beverage coffee powder as prepared in Example 1 is put into cups and 80 ml hot water is added. A fine crema comes up with a marble-like colored surface. The powder is partly or totally wetted depending on how the water is poured into the cups. After stirring the beverage, the surface is light yellow brown with concentric circles in different light shade of yellow brown. During preparation a full, strong aroma of fresh brew coffee comes up.

The crema is examined with the bare eye, and substantially no individual foam bubbles can be distinguished.

Example 3

Evaluation of the Beverage

A taste panel evaluated the samples prepared in Example 1 and 2, and then compared them with samples of commercially available soluble coffee products in the same concentration. These samples are prepared in the same concentration. The commercial available coffee products are without a crema.

A) Nescafé Gold from Germany: 2 g mixed with 70 ml hot water and 10 g whole UHT milk.

B) Nescafé au Lait: 7 g mixed with 80 ml hot water.

The samples following examples 1 and 2 are described as less bitter than A) and more aromatic than B). The overall impression of the samples following example 1 and 2 is that they are like a fresh brewed coffee without any aggressive notes.

What is claimed is:

1. A process for providing a soluble coffee beverage powder, which, upon the addition of water, forms a coffee beverage having a foamed upper layer, which process comprises: providing, as ingredients, between 10% and 35% soluble coffee solids by weight of the total dry matter of the ingredients, from about 10% to about 35% pre-flocculated creamer by weight, and from about 12% to about 30% oligosaccharrides effective to dilute protein in the creamer by weight, mixing the ingredients to a wet mix with a liquid, incorporating gas into the wet mix, and drying the wet mix to a soluble beverage powder comprising a gas-containing matrix, which soluble beverage powder upon reconstitution with water provides a foamed upper layer based upon all of the ingredients, and in which substantially all foam is made up of bubbles having a diameter in the range of 0.05 to 0.5 mm.

2. The process of claim 1, wherein the wet mix is gassed with from 1 to 3 liters of gas per kg of dry matter.

3. The process of claim 2, wherein the gassed wet mix is homogenized prior to drying.

4. The process of claim 1, wherein the soluble coffee is provided in the form of a coffee concentrate with 10% to 35% dry matter by weight of the concentrate.

5. The process of claim 1, wherein the soluble gas containing matrix includes one or more of aqueous based aroma, from about 10% to about 25% of a soluble sweetener by weight of the total dry matter of the matrix, or one or more stabilizers in an amount sufficient to reduce flocculation.

6. The process of claim 1, wherein the oligosaccharrides are present in an amount of between about 15% and about 25% and are provided by oligofructose or lactose.

7. A process for providing a coffee beverage having a foamed upper layer, which process comprises: providing a soluble coffee beverage powder according to claim 1, and reconstituting the powder with water to provide a coffee beverage having a foamed upper layer in which substantially all foam is made up of bubbles having a diameter in the range of 0.05 to 0.5 mm.

8. A process for providing a coffee beverage having a foamed upper layer, which process comprises: providing a soluble coffee beverage powder that includes a soluble gas containing matrix comprising, as ingredients, between 10% and 35% soluble coffee solids by weight of the total dry matter of the matrix, from about 10% to about 35% pre-flocculated creamer by weight, and from about 12% to about 30% oligosaccharrides effective to dilute protein in the creamer by weight, and reconstituting the powder with water to provide a coffee beverage having a foamed upper layer in which substantially all foam is made up of bubbles having a diameter in the range of 0.05 to 0.5 mm.

\* \* \* \* \*